United States Patent

[11] 3,598,418

| [72] | Inventors | John R. Ward<br>Owings;<br>Harry J. Skruch, Baltimore; Joseph H. Morris, Stevensville, all of, Md. |
|---|---|---|
| [21] | Appl. No. | 862,200 |
| [22] | Filed | Sept. 30, 1969 |
| [45] | Patented | Aug. 10, 1971 |
| [73] | Assignee | The United States of America as represented by the Secretary of the Navy |

[54] SLEEVE SEAL SHAPE CONTROL
4 Claims, 1 Drawing Fig.

[52] U.S. Cl. .................................................. 277/165, 277/71
[51] Int. Cl. ................................................ F16j 9/06, F16j 15/00
[50] Field of Search .......................................... 277/152, 116, 71, 73, 115, 165

[56] References Cited
UNITED STATES PATENTS

| 1,972,809 | 9/1934 | Watson et al. ............... | 277/165 |
| 2,332,763 | 10/1943 | Stewart ........................ | 277/71 X |
| 2,557,039 | 6/1951 | Stewart ........................ | 277/116 X |
| 3,303,757 | 2/1967 | Ward ............................ | 277/75 X |

Primary Examiner—Samuel B. Rothberg
Attorneys—R. S. Sciascia, Q. E. Hodges, A. Sopp and W. E. McCarthy ABSTRACT: An apparatus for controlling the curved or contoured ends of sleeve seals by altering the natural belled shape of the seal to thereby obtain the desired seating and sealing pressures.

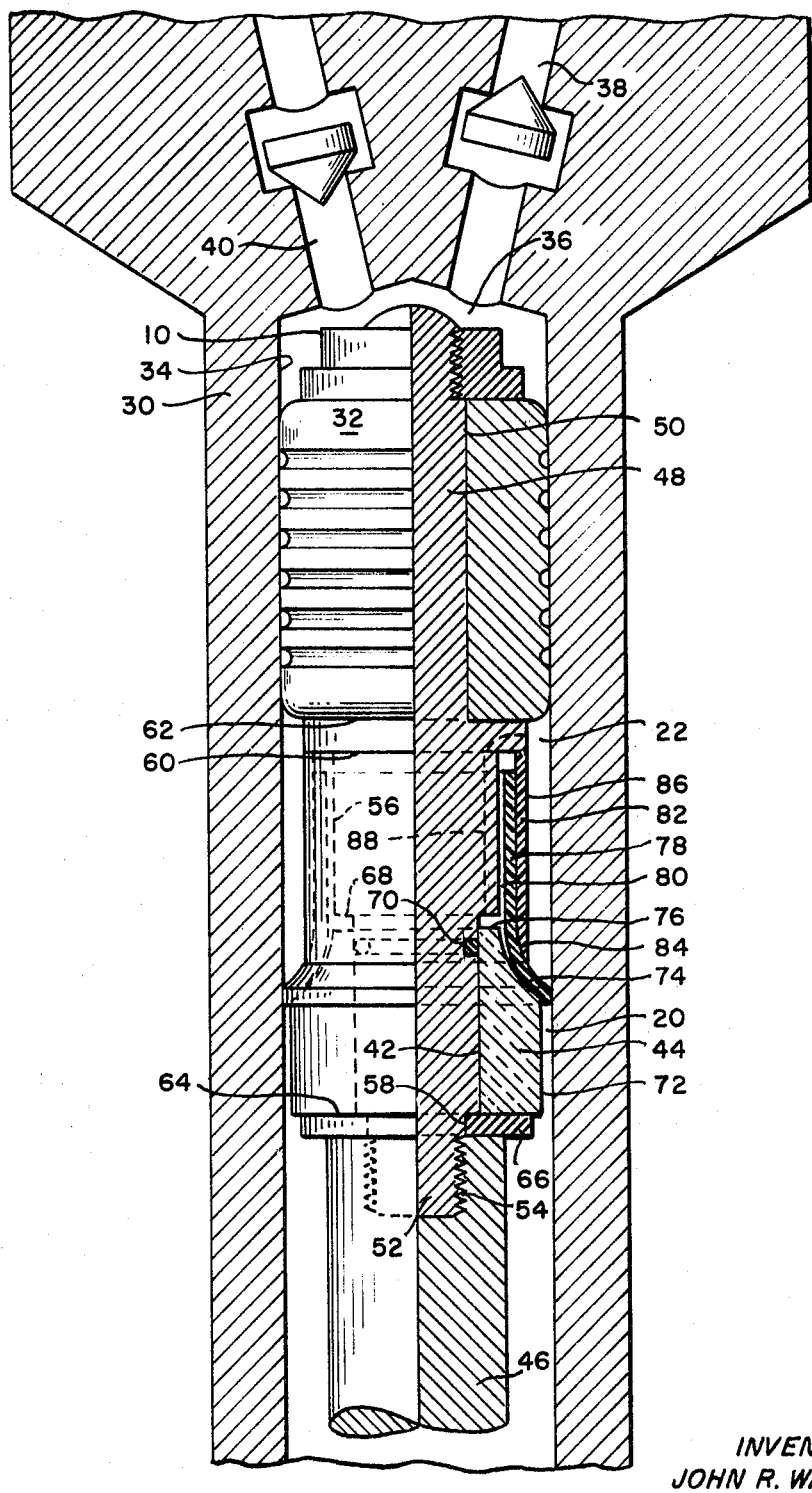

even when worn very thin. Likewise, the follower 44 is provided with a radial passage 90 extending from an axial port 92 leading to the cylinder 36 to the concave surface 74 so as to pressurize behind the sealing sleeve 78. Thus, pressure fluid behind the sleeve 78 urges it against the surface of the bore 34, the high pressure end or portion of the sleeve 78 being maintained in substantial abutting relationship with the follower member 44.

SLEEVE SEAL SHAPE CONTROL

BACKGROUND OF THE INVENTION

The present invention relates broadly to seals and more particularly to improved sleeve seals for pistons, shafts, and the like operating under both high and low pressures.

In conventional piston engines and compressors, the typical sealing devices have included segmented or sectional seal element which seal and wear in planes perpendicular to the reciprocating axis of the piston and consequently are subject to considerable leakage. Piston rings and radial-tangential-type piston rod seals exemplify this class of seals. However, a more recently developed sealing concept, involving the use of sleeve seals, has substantially reduced leakage problems in high pressure apparatus. This recent concept is shown and described in U.S. Pat. No. 3,303,757.

The aforementioned patent illustrates an unsegmented, unjointed, and self-lubricating seal member having an unusually large wear allowance.

The sealing concept disclosed in the aforementioned patent has been shown in operation to perform well when employed in nonlubricated piston-type compressors at pressures of 2,000 and above.

However, at lower pressures, the sleeve seal member of the prior art patent is not fully capable of obtaining sufficient seating forces to maintain an effective dynamic seal.

SUMMARY OF THE INVENTION

The general purpose of this invention is to provide a sleeve sealing device that has all of the advantages of similarly employed prior art seals and has none of the above described disadvantages. To attain this, the present invention provides means to control the seating and sealing forces of a sleeve seal by restraining the movement of the seal particularly at lower pressures. The present invention comprises essentially a hollow cylinder or constraining sleeve disposed outside and concentric with the sleeve seal. The constraining sleeve is positioned so as not to make frictional contact with the piston cylinder and therefore the constraining sleeve is not subject to wear.

OBJECTS OF THE INVENTION

An object of the present invention is to provide a relatively maintenance-free seal which will operate effectively at high and low pressures.

Another object of the present invention is to provide a control sleeve for a seal to control the shape and the sealing contact areas of the seal.

A still further object of the invention is to provide an oil-free, self-lubricating seal suitable for use in high pressure compressors and the like.

Another important object of the invention is to provide a seal which is durable, long lasting, and has effective sealing characteristics in high pressure compressors under all possible dynamic conditions encountered.

Still another object of the invention is to provide a seal which is inexpensive to manufacture and does not require excessive attention to manufacturing tolerances.

Other objects and advantages of the present invention will become apparent from the following description of a preferred embodiment thereof, the claims, and the drawing in which:

BRIEF DESCRIPTION OF THE DRAWING

The FIGURE is a view, partly in section, of a seal embodying the invention shown in association with a portion of a compressor.

DESCRIPTION OF THE PREFERRED EMBODIMENT

Referring in detail to the drawing, the FIGURE illustrates a sleeve seal embodying the invention and is hereinafter to be described with reference to exemplary use with an air compressor comprising a cylinder member 30 and a piston 32. The cylinder member 30 has a bore 34 in which the piston 32 is reciprocable toward and from a high pressure zone 36 which is served with inlet and outlet passages 38 and 40.

The piston 32 is carried on a reduced rod portion 50 of a removable piston rod section 48. A threaded end 52 of rod section 48 is threadedly engaged with threaded bore 54 of a piston rod 46. The piston rod section 48 also has bearing surfaces 42, 56, and 58 and axially facing shoulders 60, 62, 64, and 68 to provide various gripping and sliding surfaces. Suitable securing means 10 secures the piston 32 on the rod section 48.

Disposed in surrounding relationship to the bearing surface 42 is an annular follower member 44 which is restrained from axial movement by a collar 66 and the shoulder 68. An O-ring seal 70 is provided between annular follower member 44 and piston rod section 48 to provide a further internal fluid seal. The follower member 44 is preferably formed of a rigid material, e.g. a carbon graphite composition, and fits about the bearing surface 42.

The follower member 44 is provided with a cylindrical surface 72 and an annular, concaved surface 74 which slopes generally inwardly and toward a shoulder 76 of the follower member. The surface 72 of the follower member 44 is spaced from the surface of the bore 34 by a clearance or annular space as indicated at 20.

It should be noted here that the various clearance between contiguous, juxtaposed, or mating parts are exaggerated in the drawing and are as large as necessary to provide a substantially friction free sliding fit.

Surrounding the follower member 44 and the bearing surface 56 is an annular, cylindrically shaped sealing sleeve 78. The sealing sleeve 78 is of a size providing a clearance 80 between it and bearing surface 56.

The sealing sleeve 78 is preferably a cold-flowable plastic such as polytetrafluoroethylene (PTFE) including a wear resistant filler such as bronze particles. However, other materials such as, glass fibers, molydisulfide, asbestos, and carbon may also be blended with the PTFE resin, the specific type of filler material used being dependent on the particular wear characteristics found most desirable. In general, however, the fluorocarbon group of materials, particularly the PTFE materials, offer the best elongation and wear resistance at high operating temperatures.

The end of the sleeve seal 78 which is remote from the high pressure end of the bore 34 is deformed outwardly as shown in FIG. 1 by the curved surface 74 of the follower member 44 and into engagement with the surface of bore 34.

Disposed in surrounding relationship to the sealing sleeve 78 and concentric therewith is an annular, tubular-shaped constraining sleeve 82. The constraining sleeve 82 is restricted in its axial movement by the shoulder 60 and the deformed end of the sealing sleeve 78 as shown at 84 in FIG. 1. In the preferred construction, the constraining sleeve 82 should have an axial dimension such that there is substantially no axial clearance between the constraining sleeve and the shoulder 60, and between the constraining sleeve and the deformed end of the sealing sleeve 78.

The constraining sleeve 82 does not make frictional contact on its outside surface 86 with the surface of the bore 34 and therefore the constraining sleeve 82 is not subject to wear.

The constraining sleeve 82 is preferably formed from a rigid, nonmetallic material. Specifically, the constraining sleeve can be made from the same materials as hereinbefore mentioned with respect to the sealing sleeve 78. Again, the choice of filler material to be blended with the PTFE resin depends on the desired stiffness expected from the constraining sleeve 82.

Piston rod section 48 is provided with one or more radially disposed vents or grooves 88 extending from the clearance 22 to a point along and inward of the bearing surface 56. The vents 88 permit an axial force to be applied on the entire sealing sleeve 78. The axial force applied to the sealing sleeve 78 is the result of the pressure differential acting across the seal portion extending between the clearances 20 and 22. This force causes the sealing sleeve 78 to be urged axially along the curved surface 74 of the follower member 44 away from the high pressure zone 36 so as to continuously compensate for wear of the sealing sleeve 78 against the surface of the bore 34.

When the pressure differential across the seal portion decreases, or occurs, for example, when the compressor is operating at reduced discharge pressure, the constraining sleeve 82 continues to maintain an axial force on the deformed end of the sealing sleeve 78 to prevent axial movement of the sealing sleeve and to maintain the sleeve in position along the curved surface 74 of the follower member 44.

The cylinder member 30 is preferably formed of any metal or other material which is compatible with oil-free operation of the sealing sleeve 78. In this regard it has been determined that a cylinder member 30 formed of 1040 low carbon steel, with the surface of the bore 34 plated with dense chromium plating, will result in a small amount of wear in the sealing sleeve 78 when the latter is formed of the above mentioned PTFE.

From the foregoing description it has been shown that this invention provides an improved oil-free seal for pistons shafts and the like which satisfies the previously stated objects and advantages as well as others apparent from this description.

Of course it will be recognized that while the invention has been described with reference to the incorporation of a sleeve seal in a moving piston, it is obvious that the disclosed sleeve seal could be disposed at a stationary position in a fixed cylinder for sealing against a moving piston rod. Moreover, many other modifications, variations and uses of the present invention are possible in the light of the above teachings. It is therefore understood that the invention may be practiced otherwise than as specifically described.

What we claim is:
1. A fluid seal comprising:
a cylinder;
a piston slideably mounted in said cylinder and having an annular recess defined between first and second axially spaced and facing shoulders;
an annular deformable sealing sleeve having a first undeformed portion disposed within said recess, a deformed second portion and a third unsupported portion in contact with the inside of said cylinder;
deforming means in said recess comprising a portion of said second shoulder in contact with the inside of the second deformed portion of said sealing sleeve for deforming said second portion;
an annular tubular constraining member having an outside diameter less than the inside diameter of said cylinder and being spaced from the cylinder wall, said member being closely fitted in said recess contacting and surrounding said first portion and contacting a segment of the outside of said deformed second portion for maintaining said deformed second portion in deforming engagement with said deforming means;
at least one groove in said recessed portion of said piston providing a passage for high pressure fluid from a high pressure zone to contact the end of said first undeformed portion of said sleeve; and
a chamber defined between the outside surface of said constraining member, the inside surface of said cylinder, the first axially facing shoulder, the remaining segment of the outside of said deformed second portion of said third portion, said chamber thus formed being connected to said high pressure fluid so that the high pressure fluid bears against said remaining segment of the outside of said deformed second portion to maintain it in deforming engagement with said deforming means and also bears against said third portion to maintain contact of said third portion with the inside of said cylinder.
2. The fluid seal as defined in claim 1 wherein said deforming means comprises:
an annular member having a concaved guide surface, said guide surface extending from a point within said annular recess to a point adjacent to but spaced from said cylinder and curving in a direction away from said high pressure zone.
3. The fluid seal as defined in claim 1 wherein said annular tubular constraining member comprises a rigid nonmetallic material.
4. The fluid seal as defined in claim 3 wherein said nonmetallic material comprises polytetrafluoroethylene.